United States Patent
Shu et al.

(10) Patent No.: US 9,128,865 B2
(45) Date of Patent: Sep. 8, 2015

(54) METHOD AND APPARATUS FOR CONTROLLING PARITY CHECK FUNCTION OF CONTENT ADDRESSABLE MEMORY DEVICE SUPPORTING PARTIAL WRITE OPERATION

(71) Applicant: MEDIATEK INC., Hsin-Chu (TW)

(72) Inventors: Hang-Kaung Shu, Hsinchu (TW); Kuan-Hong Lin, Changhua County (TW); Chi-Wei Peng, Hsinchu County (TW)

(73) Assignee: MEDIATEK INC., Science-Based Industrial Park, Hsin-Chu (TW)

(*) Notice: Subject to any disclaimer, the term of this patent is extended or adjusted under 35 U.S.C. 154(b) by 77 days.

(21) Appl. No.: 14/037,340

(22) Filed: Sep. 25, 2013

(65) Prior Publication Data

US 2014/0108884 A1   Apr. 17, 2014

Related U.S. Application Data (60) Provisional application No. 61/712,940, filed on Oct. 12, 2012.

(51) Int. Cl.
*H03M 13/00* (2006.01)
*G06F 11/10* (2006.01)

(52) U.S. Cl.
CPC ........ *G06F 11/1008* (2013.01); *G06F 11/1064* (2013.01)

(58) Field of Classification Search
CPC ... G06F 11/1008; G06F 11/1064; G06F 3/06; G06F 3/067; G06F 3/0659; G06F 3/061; G11C 7/24; G11C 15/043; G11C 11/406; G11C 15/04; G11C 29/42; G11C 29/44; G11C 15/00; G11C 29/20; G11C 2029/0411; G11C 2029/1208; G11C 2029/3602; H03M 13/09

See application file for complete search history.

(56) References Cited

U.S. PATENT DOCUMENTS

| | | | |
|---|---|---|---|
| 6,597,595 B1* | 7/2003 | Ichiriu et al. | 365/49.18 |
| 6,914,795 B1* | 7/2005 | Srinivasan et al. | 365/49.18 |
| 6,978,343 B1* | 12/2005 | Ichiriu | 711/108 |
| 7,002,823 B1* | 2/2006 | Ichiriu | 365/49.17 |
| 7,257,763 B1* | 8/2007 | Srinivasan et al. | 714/764 |
| 8,533,578 B2* | 9/2013 | Ramaraju et al. | 714/805 |
| 2003/0074630 A1* | 4/2003 | Batson et al. | 714/805 |
| 2004/0123022 A1* | 6/2004 | Regev et al. | 711/108 |
| 2004/0123024 A1* | 6/2004 | King | 711/108 |
| 2008/0049522 A1* | 2/2008 | Cohen | 365/189.07 |
| 2011/0307769 A1* | 12/2011 | Ramaraju et al. | 714/801 |
| 2012/0054427 A1* | 3/2012 | Huang et al. | 711/108 |

* cited by examiner

*Primary Examiner* — Guerrier Merant
(74) *Attorney, Agent, or Firm* — Winston Hsu; Scott Margo (57) ABSTRACT

A method for managing data stored in a content addressable memory (CAM) device includes at least the following steps: performing a partial write operation to overwrite only a portion of original write data stored in an entry of the CAM device, and storing updated write data in the entry; and updating a parity flag by a first value to indicate that parity data corresponding to the entry of the CAM device is invalid. Besides, a CAM system employing the method has a CAM device, a storage device and a parity flag controller.

20 Claims, 11 Drawing Sheets

METHOD AND APPARATUS FOR CONTROLLING PARITY CHECK FUNCTION OF CONTENT ADDRESSABLE MEMORY DEVICE SUPPORTING PARTIAL WRITE OPERATION

CROSS REFERENCE TO RELATED APPLICATIONS

This application claims the benefit of U.S. provisional application No. 61/712,940, filed on Oct. 12, 2012 and incorporated herein by reference.

BACKGROUND

The disclosed embodiments of the present invention relate to performing parity check upon data stored in a content addressable memory (CAM) device, and more particularly, to a method and apparatus for controlling a parity check function of a CAM device which supports a partial write operation (e.g., a write mask function).

An essential semiconductor device is a semiconductor memory, such as a random access memory (RAM). A RAM allows a memory circuit to execute both read and write operations on its memory cells. Typical examples of RAM devices include the dynamic random access memory (DRAM) and the static random access memory (SRAM). Another form of the memory is a content addressable memory (CAM). A CAM device is a memory device that accelerates any application requiring a fast search of a database. The CAM device compares input search data against a table of stored data, and returns the address of the matched data. In other words, in the CAM device, stored data within a CAM array is not accessed by initially supplying an address, but rather by initially applying the input search data (e.g., a search word) to the CAM array and then performing a compare operation to identify one or more row locations (i.e., entry addresses) within the CAM array that contain data equivalent to the applied input search data and thereby represent a "match" condition. In this manner, stored data is accessed according to its content rather than its address. Hence, the CAM device is a good choice for implementing a lookup operation due to its fast search capability. For example, due to their unique searching algorithms, the CAM devices are frequently employed in network equipment (particularly, routers and switches), computer systems and other devices that require rapid content searching.

As mentioned above, the main function of the CAM device is data comparison based on data stored in the CAM array composed of a plurality of CAM cells, where each CAM cell may include an SRAM cell and a compare circuit. However, in the manufacture process, it is possible that the CAM array may have one or more faulty/defective CAM cells which fail to perform their intended functionality. Suppose that the CAM with faulty/defective CAM cells is used to store lookup table data and then perform data comparison. If the input search data is identical to data stored into a specific entry/row with faulty/defective CAM cell(s), the CAM device may fail to identify the specific entry/row as having a match condition due to the faulty/defective CAM cell(s).

To detect the existence of faulty/defective CAM cell(s) in each entry/row of the CAM device, a parity check function may be implemented to check correctness of write data actually stored in each CAM entry/row. However, it is possible that the CAM device may support a write mask function which performs a byte write operation to partially update write data stored in a CAM entry/row. As the parity data is generally generated while original write data is stored into the CAM entry/row, applying parity check to the partially updated write data according to the parity data generated based on the original write data would fail to achieve the intended purpose of checking correctness of the write data actually stored in the CAM entry/row.

SUMMARY

In accordance with exemplary embodiments of the present invention, a method and apparatus for controlling a parity check function of a content addressable memory (CAM) device which supports a partial write operation (e.g., a write mask function) are proposed to solve the above-mentioned problem.

According to a first aspect of the present invention, an exemplary method for managing data stored in a content addressable memory (CAM) device is disclosed. The exemplary method includes at least the following steps: performing a partial write operation to overwrite only a portion of write data stored in an entry of the CAM device by partial write data, and storing updated write data in the entry of the CAM device; and updating a parity flag by a first value to indicate that parity data corresponding to the entry of the CAM device is invalid.

According to a second aspect of the present invention, an exemplary method for checking data stored in a content addressable memory (CAM) device is disclosed. The exemplary method includes at least the following steps: reading a parity flag associated with an entry of the CAM device, wherein the parity flag is set to indicate whether parity data corresponding to the entry of the CAM device is valid or invalid; and referring to the parity flag for selectively performing parity check upon write data read from the entry of the CAM device according to the parity data corresponding to the entry of the CAM device.

According to a third aspect of the present invention, an exemplary method for managing data stored in a content addressable memory (CAM) device is disclosed. The exemplary method includes at least the following steps: performing a partial write operation to overwrite only a portion of write data stored in an entry of the CAM device by partial write data, and storing updated write data in the entry of the CAM device; generating updated parity data based on at least write data read from the entry of the CAM device; and overwriting original parity data by the updated parity data, wherein the original parity data is generated based on original write data stored into the entry of the CAM device.

According to a fourth aspect of the present invention, an exemplary content addressable memory (CAM) system is disclosed. The exemplary CAM system includes a CAM device, a storage device and a parity flag controller. The CAM device is arranged for performing a partial write operation to overwrite only a portion of write data stored in an entry of the CAM device by partial write data, and storing updated write data in the entry of the CAM device. The storage device is arranged for storing a parity flag of parity data corresponding to the entry of the CAM device. The parity flag controller is arranged for updating the parity flag by a first value to indicate that the parity data corresponding to the entry of the CAM device is invalid.

According to a fifth aspect of the present invention, an exemplary content addressable memory (CAM) system is disclosed. The exemplary CAM system includes a CAM device, a storage device, and a parity check unit. The CAM device is arranged for storing write data in an entry of the CAM device. The storage device is arranged for storing parity data and a parity flag, wherein the parity flag is set to indicate whether the parity data corresponding to the entry of the CAM device is valid or invalid. The parity check unit is arranged for reading the parity flag from the storage device, and referring to the parity flag for selectively performing parity check upon the write data read from the entry of the CAM device according to the parity data corresponding to the entry of the CAM device.

According to a sixth aspect of the present invention, an exemplary content addressable memory (CAM) system is disclosed. The exemplary CAM system includes a CAM device and a parity calculator. The CAM device is arranged for performing a partial write operation to overwrite only a portion of write data stored in an entry of the CAM device by partial write data, and storing updated write data in the entry of the CAM device. The parity calculator is arranged for generating updated parity data based on at least write data read from the entry of the CAM device, and overwriting original parity data by the updated parity data, wherein the original parity data is generated by the parity calculator based on original write data stored into the entry of the CAM device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
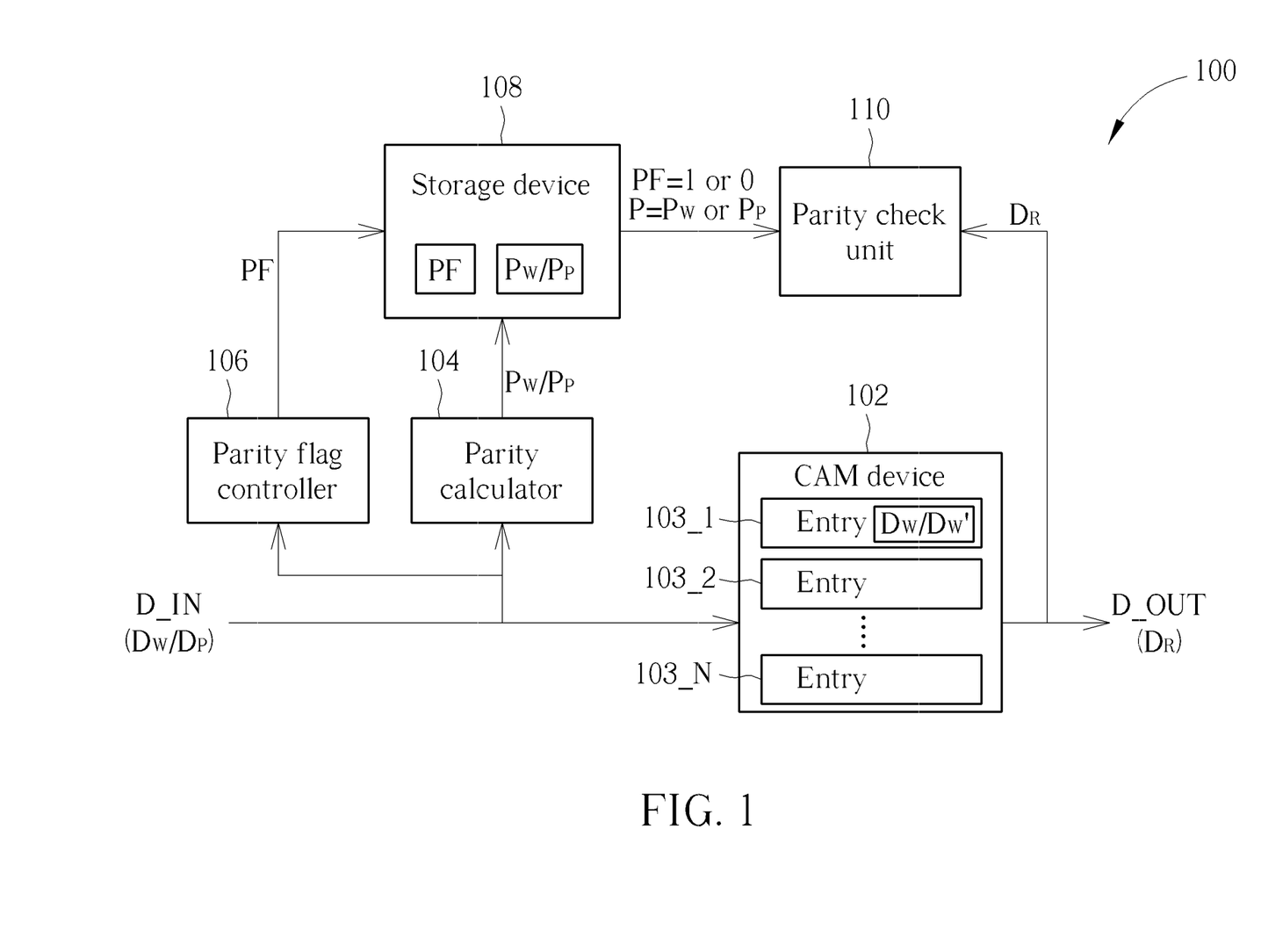
FIG. 1 is a block diagram illustrating a content addressable memory (CAM) system according to a first embodiment of the present invention.

FIG. 1 is a block diagram illustrating a content addressable memory (CAM) system according to a first embodiment of the present invention. The CAM system 100 includes a CAM device 102, a parity calculator (e.g., a parity encoder) 104, a parity flag controller 106, a storage device (e.g., an SRAM) 108, and a parity check unit 110. In the present invention, the parity calculator, the parity flag controller, and/or the parity check unit may be implemented using hardware circuits only. However, this is not meant to be a limitation of the present invention. The CAM device 102 may be implemented using any conventional CAM structure, and therefore has a plurality of entries (i.e., rows) 103_1, 103_2, . . . , 103_N, where the value of N may be adjusted based on actual design consideration/requirement. Before input search data is input for data comparison, the CAM device 102 receives and stores input data D_IN (e.g., data of a look-up table). Specifically, the CAM device 102 receives write data $D_W$, and stores the write data $D_W$ into a selected entry (e.g., 103_1) at a designated address.

In this embodiment, a parity check function is implemented for checking correctness of the data actually stored in the CAM device 102. Hence, the CAM device 102 further provides output data D_OUT stored therein. For example, stored write data $D_R$ read from the selected entry (e.g., 103_1) at the designated address is output from the CAM device 102. If there is no faulty/defective CAM cell existing in the selected entry (e.g., 103_1) at the designated address and no additional data adjustment/update performed, the write data $D_R$ read from the selected entry should be identical to the original write data $D_W$ stored into the selected entry. The operational principle of the CAM system 100 is detailed as below. For clarity and simplicity, only the processing associated with one write data for one CAM entry is described as below.

When the original write data $D_W$ is input, the CAM device 102 performs a non-partial write operation to store the original write data $D_W$ into the selected entry 103_1 of the CAM device 102 according to a designated address. Besides, the parity calculator 104 generates original parity data $P_W$ based on the original write data $D_W$ received by the CAM device 102, and stores the original parity data $P_W$ into the storage device 108. The parity flag controller 106 sets a parity flag PF stored in the storage device 108 by one logic value (e.g., "0" or "1") to indicate that the original parity data $P_W$ is valid. For one example, when the parity flag PF is set by "1", associated parity data is indicated as valid; and when the parity flag PF is set by "0", the associated parity data is indicated as invalid. For another example, when the parity flag PF is set by "0", the associated parity data is indicated as valid; and when the parity flag PF is set by "1", the associated parity data is indicated as invalid.

Figure 2:
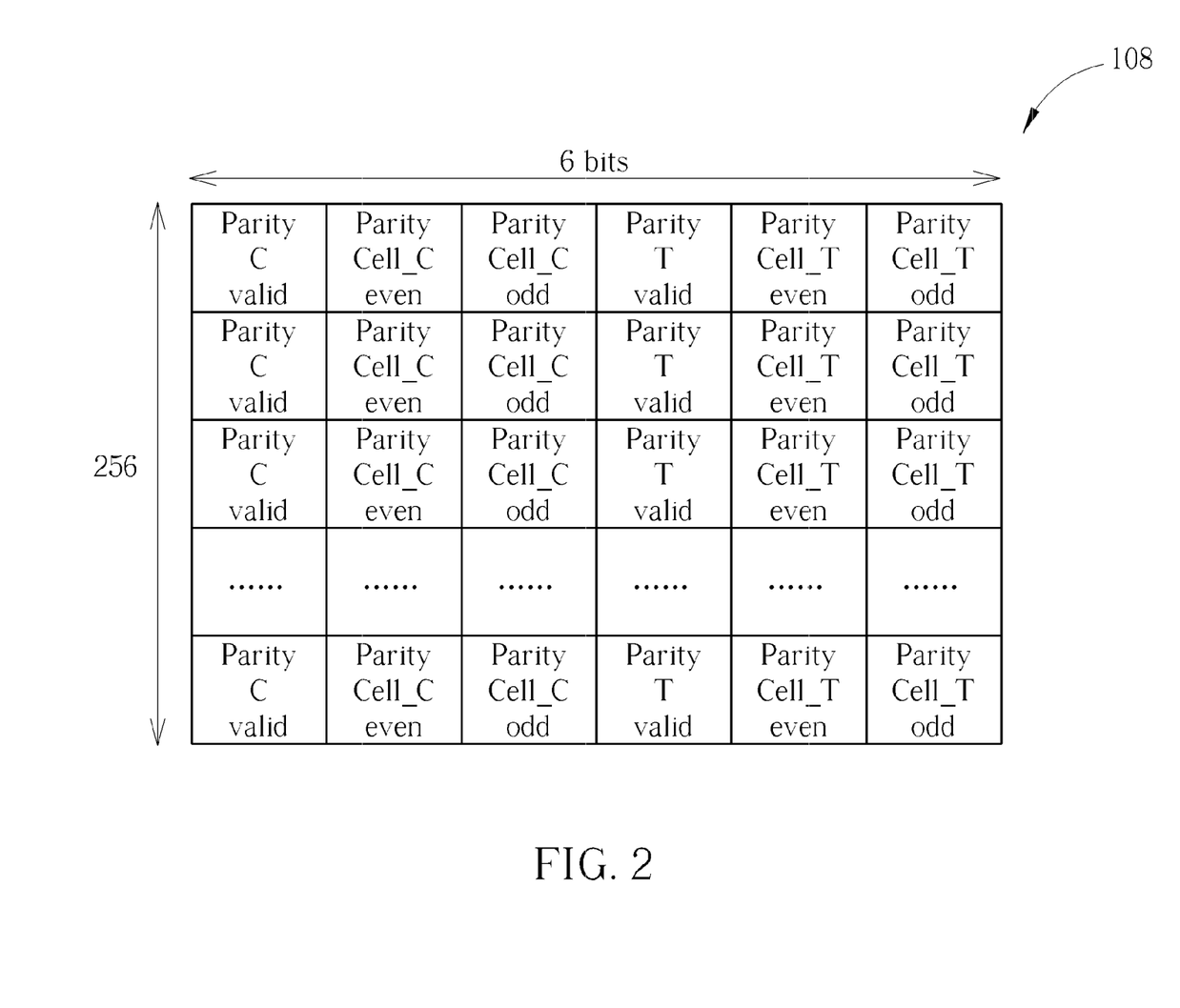
FIG. 2 is a diagram illustrating distribution of parity flags and parity data stored in a storage device according to an embodiment of the present invention.

In this embodiment, the storage device 108 may be implemented using one or more memory chips for storing the parity data and associated parity flag for each entry of the CAM device 102. Besides, memory addresses of the parity data and associated parity flag for a CAM entry may be determined based on an entry address of the CAM entry. FIG. 2 is a diagram illustrating distribution of parity flags and parity data stored in the storage device 108 according to an embodiment of the present invention. Assume that the CAM device 102 is composed of ternary CAM (TCAM) cells. The cell-T parity data and associated cell-T parity flag of a CAM entry are both stored in adjacent memory addresses, and the cell-C parity data and associated cell-C parity flag of a CAM entry are both stored in adjacent memory addresses. However, this is for illustrative purposes only, and is not meant to be a limitation of the present invention.

In this embodiment, the CAM device 102 supports a partial write operation (e.g., a write mask function). Hence, when the write mask function is activated, the CAM device 102 overwrites a portion of stored write data in a CAM entry with the rest of the stored write data in the same CAM entry kept intact. In other words, the data stored in the CAM entry will include bits of the originally stored data and bits of newly stored data. The present invention proposes using a parity flag to prevent the parity check operation from being erroneously applied to such partially updated data stored in the CAM entry. More specifically, when partial write data $D_P$ is input, the CAM device 102 performs a partial write operation to overwrite only a portion of write data stored in the selected entry 103_1 of the CAM device 102, and accordingly stores updated write data $D_W'$ in the selected entry 103_1, where the data length of the partial write data $D_P$ is shorter than that of the original write data $D_W$. In a case where there is no faulty/defective CAM cell existing in the selected entry 103_1, the original write data $D_W$ is stored in the selected entry 103_1, and then partially updated by the partial write data $D_P$. As a result, the updated write data $D_W'$ would have a first data section derived from the original write data $D_W$ and a second data section derived from the partial write data $D_P$.

In addition, when detecting that the partial write operation is performed by the CAM device 102, the parity flag controller 106 updates the parity flag PF in the storage device 108 by another logic value (e.g., "1" or "0") to indicate that the partial data corresponding to the selected entry 103_1 of the CAM device 102 is invalid. In one preferred design, when the partial write operation is performed by the CAM device 102, the parity calculator 104 neither calculates new parity data $P_P$ based on the partial write data $D_P$, nor overwrites the original parity data $P_W$ by the new parity data $P_P$. Alternatively, the parity calculator 104 may calculate the new parity data $P_P$ based on the partial write data $D_P$, and overwrite the original parity data $P_W$ by the new parity data $P_P$. However, no matter whether the original parity data $P_W$ remains intact or is replaced by the new parity data $P_P$, the parity data corresponding to the selected entry 103_1 should not be used for checking correctness of the partially updated write data stored in the selected entry 103_1. This is achieved by using the parity flag controller 106 to update the parity flag PF to indicate that the partial data corresponding to the selected entry 103_1 is invalid.

With regard to the parity check unit 110, it is responsible for verifying the correctness of the data actually stored in the CAM device 102. Hence, the parity check unit 110 reads write data $D_R$ stored in the selected entry 103_1 from the CAM device 102. It should be noted that, when there is no faulty/defective CAM cell existing in the entry 103_1, the write data $D_R$ read from the CAM device 102 should be identical to the original write data $D_W$ (if no partial write operation is performed) or the partially updated write data $D_W'$ as expected to be stored in the selected entry 103_1 (if the partial write operation is performed). In this embodiment, the parity check unit 110 further reads the parity flag PF and the parity data corresponding to the selected entry 103_1, where the parity data P read from the storage device 108 is the original parity data $P_W$ (if no partial write operation is performed or no parity update is performed along with the partial write operation executed) or the new parity data $P_P$ (if parity update is performed along with the partial write operation executed).

As mentioned above, the parity flag PF has one of two different logic values "1" and "0", where one value (e.g., "1") indicates that the associated parity data P is valid, and the other value (e.g., "0") indicates that the associated parity data P is invalid. The parity check unit 110 first checks the parity flag PF to know the validity/invalidity of the associated parity data P. In a case where the parity flag PF set by the parity flag controller 106 indicates that the associated parity data P is valid, the parity check unit 110 performs parity check upon the write data $D_R$ read from the selected entry 103_1 according to the parity data P corresponding to the selected entry 103_1. When the write data $D_R$ passes the parity check, this means the data actually stored in the selected entry 103_1 is exactly the same as the original write data $D_W$. When the write data $D_R$ fails to pass the parity check, this means the data actually stored in the entry 103_1 has error bit(s). In another case where the parity flag PF set by the parity flag controller 106 indicates that the associated parity data P is invalid, the parity check unit 110 skips the parity check directly. That is, since the parity data P is indicated as invalid, there is no need to perform parity check upon the write data $D_R$ according to the invalid parity data P.

Figure 3A:
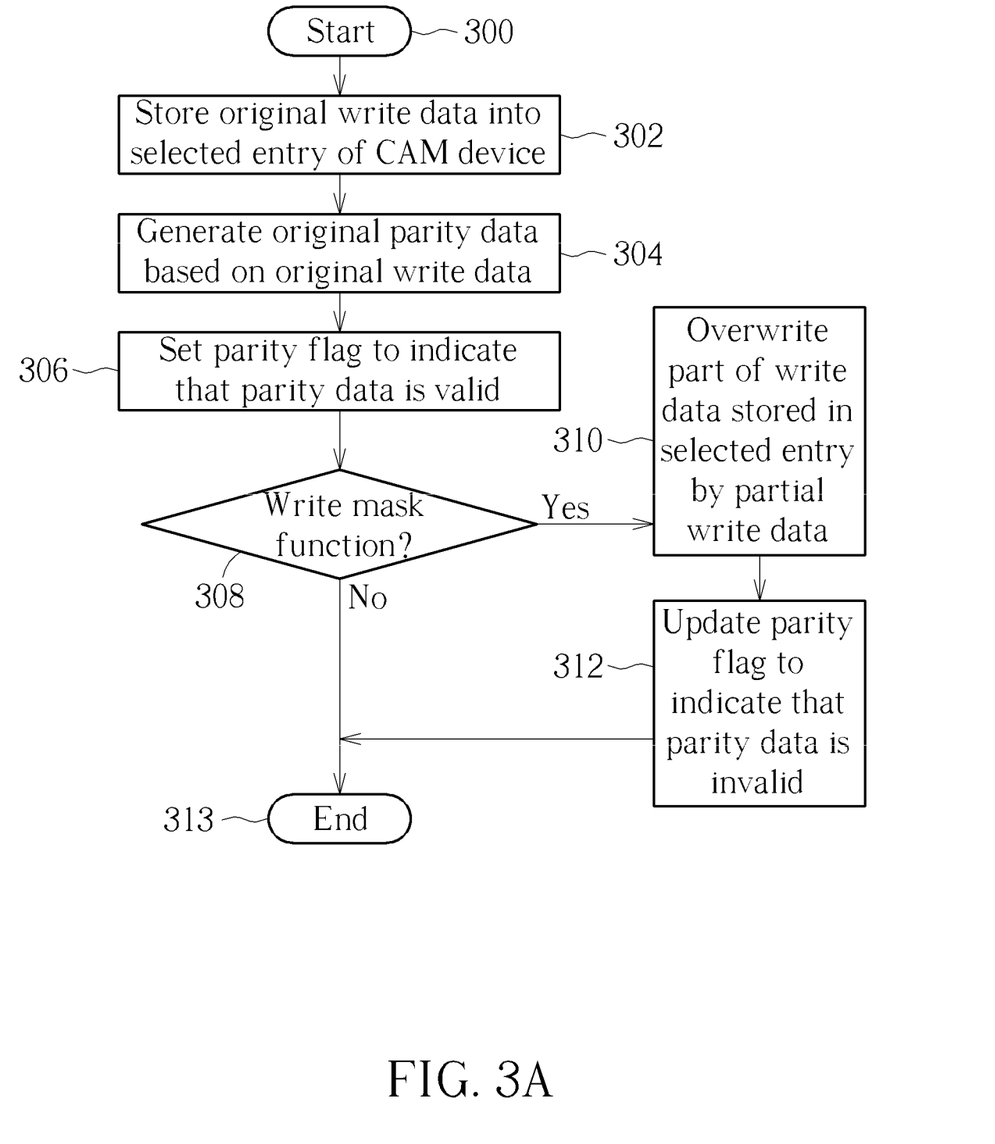
FIG. 3A and FIG. 3B are flowcharts illustrating a method of managing data stored in a CAM device according to a first embodiment of the present invention.
Figure 3B:
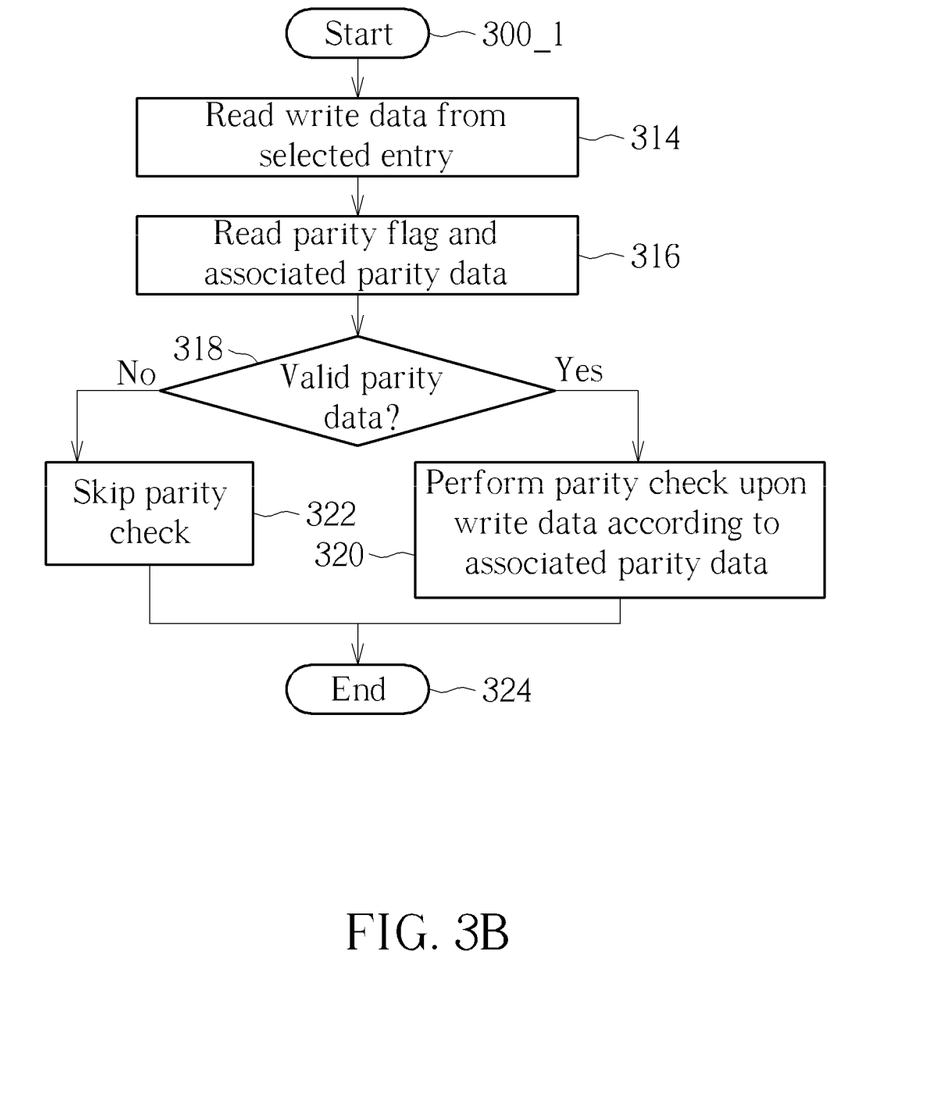

FIG. 3A and FIG. 3B are flowcharts illustrating a method of managing data stored in a CAM device according to a first embodiment of the present invention, where FIG. 3A shows the operation of encoding write data to generate parity data and the operation of setting the parity flag, and FIG. 3B shows the operation of performing the parity check. Provided that the result is substantially the same, the steps are not required to be executed in the exact order shown in FIG. 3A and FIG. 3B. The exemplary method may be employed by the CAM system 100 shown in FIG. 1, and can be briefly summarized using following steps.

Step 300: Start.

Step 302: Perform a non-partial write operation to store original write data (e.g., cell-C write data or cell-T write data) into a selected entry of a CAM device.

Step 304: Generate original parity data (e.g., cell-C parity data or cell-T parity data) based on the original write data, and store the original parity data into a storage device.

Step 306: Set a parity flag (e.g., a cell-C parity flag or a cell-T parity flag) by one value to indicate that the original parity data is valid.

Step 308: Check if a write mask function is activated to perform a partial write operation upon data stored in the selected entry. If yes, go to step 310; otherwise, go to step 313.

Step 310: Perform a partial write operation to overwrite only a portion of write data stored in the selected entry of the CAM device by partial write data, and accordingly store updated write data (i.e., write data which is partially updated) in the selected entry of the CAM device.

Step 312: Update the parity flag by another value to indicate that parity data corresponding to the selected entry of the CAM device is invalid.

Step 313: End.

Step 300_1: Start.

Step 314: Read write data from the selected entry of the CAM device.

Step 316: Read the parity flag and the associated parity data corresponding to the selected entry from the storage device.

Step 318: Check if the parity flag indicates that the associated parity data is valid. If yes, go to step 320; otherwise, go to step 322.

Step 320: Perform parity check upon the write data read from the selected entry of the CAM device according to the associated parity data read from the storage device. Go to step 324.

Step 322: Skip the parity check.

Step 324: End.

It is noted that the steps are not required to be executed in the exact order shown in FIG. 3A and FIG. 3B. For example, step 308 is not necessary to be executed directly after step 306, and the step 318 is not necessary to be executed directly after step 316 in some embodiments. As a person skilled in the art can readily understand details of each step shown in FIG. 3A and FIG. 3B after reading above paragraphs directed to the CAM system 100 shown in FIG. 1, further description is omitted here for brevity.

In the exemplary embodiment shown in FIG. 1, the parity flag controller 106 is used to set a parity flag to indicate validity/invalidity of associated parity data. Hence, the parity check unit 110 may refer to the parity flag to determine if the parity check should be executed. In an alternative design, the parity flag controller 106 may be omitted due to a modified parity update scheme proposed by the present invention.

Figure 4:
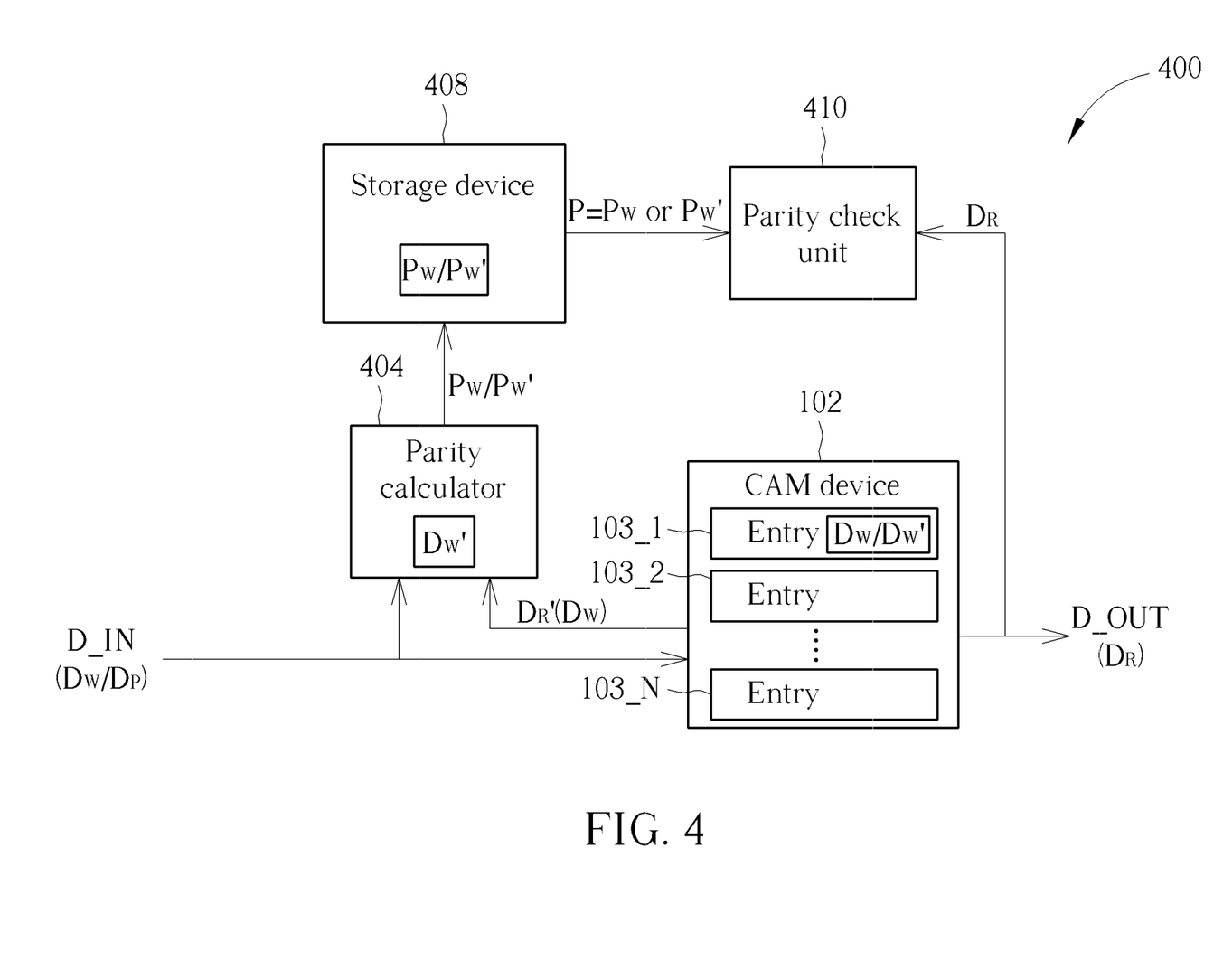
FIG. 4 is a block diagram illustrating a CAM system according to a second embodiment of the present invention.

Please refer to FIG. 4, which is a block diagram illustrating a CAM system according to a second embodiment of the present invention. For clarity and simplicity, only the processing associated with one write data for one CAM entry is described as below. The CAM system 400 includes a parity calculator (e.g., a parity encoder) 404, a storage device (e.g., an SRAM) 408, a parity check unit 410 and the aforementioned CAM device 102. When the original write data $D_W$ is input, the CAM device 102 performs a non-partial write operation to store the original write data $D_W$ into a selected entry (e.g., 103_1) of the CAM device 102 according to a designated address. Besides, the parity calculator 404 generates original parity data $P_W$ based on the original write data $D_W$ received by the CAM device 102, and stores the original parity data $P_W$ into the storage device 408. As mentioned above, the CAM device 102 supports a partial write operation (e.g., a write mask function). Hence, partial write data $D_P$ may be input to update a portion of write data stored in a CAM entry.

In this embodiment, when detecting that a write mask function is going to be activated by the CAM device 102, the parity calculator 404 is operative to generate updated parity data $P_W'$. That is, the parity update operation is performed before the CAM device 102 performs a partial write operation to overwrite only a portion of write data stored in the selected entry 103_1 by the partial write data $D_P$. More specifically, the parity calculator 404 reads write data $D_R'$ from the selected entry 103_1 of the CAM device 102. If there is no faulty/defective CAM cell existing in the selected entry 103_1, the write data $D_R'$ should be identical to the original write data $D_W$ stored in to the selected entry 103_1. Next, the parity calculator 404 refers to the write mask information to know the bit positions to which the partial write data $D_P$ should be applied, updates only a portion of the write data $D_R'$ read from the selected entry 103_1 by the partial write data $D_P$, and generates updated write data $D_W'$ accordingly. It should be noted that, if there is no faulty/defective CAM cell existing in the selected entry 103_1, the updated write data $D_W'$ generated by the parity calculator 404 should be identical to the partially updated write data as expected to be stored in the selected entry 103_1 by the partial write operation. After obtaining the updated write data $D_W'$, the parity calculator 404 calculates the updated parity data $P_W'$ for the updated write data $D_W'$, and stores the updated parity data $P_W'$ into the storage device 408 to overwrite the original parity data $P_W$.

After the original parity data $P_W$ is replaced by the updated parity data $P_W'$ through the parity calculator 404, the CAM device 102 starts performing a partial write operation to overwrite only a portion of write data stored in the selected entry 103_1, and accordingly stores the updated write data $D_W'$ in the selected entry 103_1.

In accordance with the proposed parity data update scheme, if there is no partial write operation performed upon the data stored in the selected entry 103_1, the corresponding parity data P read from the storage device 408 is the original parity data $P_W$; and if there is a partial write operation performed upon the data stored in the selected entry 103_1, the corresponding parity data P read from the storage device 408 is the updated parity data $P_W'$.

The parity check unit 410 is responsible for verifying the correctness of the data actually stored in the CAM device 102. Hence, the parity check unit 410 reads write data $D_R$ stored in the selected entry 103_1 of the CAM device 102. It should be noted that, when there is no faulty/defective CAM cell existing in the entry 103_1, the write data $D_R$ read from the CAM device 102 should be identical to the original write data $D_W$ (if no partial write operation is performed) or the partially updated write data $D_W'$ as expected to be stored in the selected entry 103_1 (if the partial write operation is performed). The parity check unit 410 further reads the parity data P corresponding to the selected entry 103_1. Next, the parity check unit 410 performs parity check upon the write data $D_R$ read from the selected entry 103_1 according to the parity data P corresponding to the selected entry 103_1. When the write data $D_R$ passes the parity check, this means the data actually stored in the entry 103_1 is exactly the same as the original write data $D_W$ (if no partial write operation is performed) or the partially updated write data $D_W'$ (if the partial write operation is performed). When the write data $D_R$ fails to pass the parity check, this means the data actually stored in the entry 103_1 has error bit(s).

Figure 5:
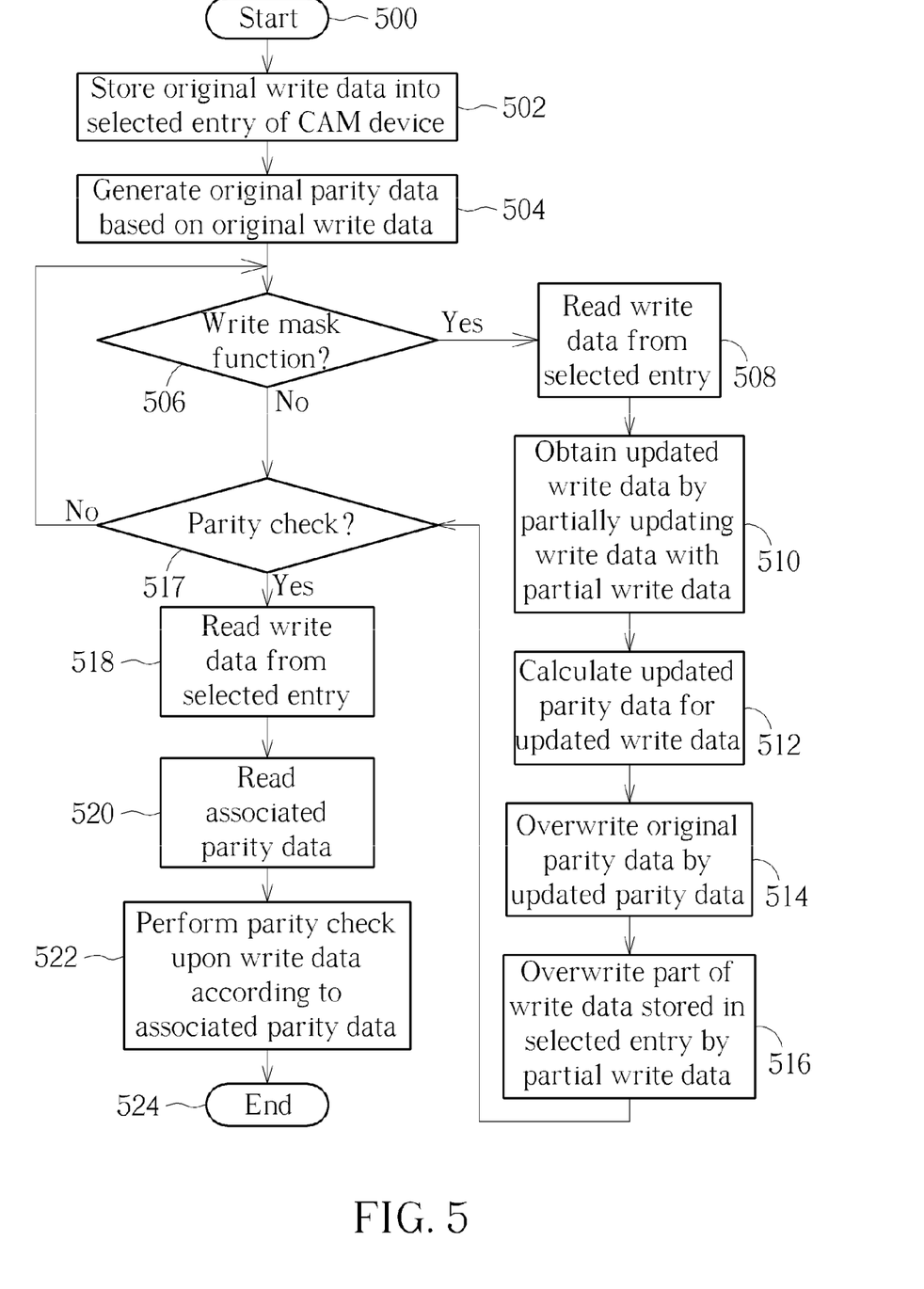
FIG. 5 is a flowchart illustrating a method of managing data stored in a CAM device according to a second embodiment of the present invention.

FIG. 5 is a flowchart illustrating a method of managing data stored in a CAM device according to a second embodiment of the present invention. Provided that the result is substantially the same, the steps are not required to be executed in the exact order shown in FIG. 5. The exemplary method may be employed by the CAM system 400 shown in FIG. 4, and can be briefly summarized using following steps.

Step 500: Start.

Step 502: Perform a non-partial write operation to store original write data (e.g., cell-C write data or cell-T write data) into a selected entry of a CAM device.

Step 504: Generate original parity data (e.g., cell-C parity data or cell-T parity data) based on the original write data, and store the original parity data into a storage device.

Step 506: Check if a write mask function is going to be activated to perform a partial write operation upon data stored in the selected entry. If yes, go to step 508; otherwise, go to step 517.

Step 508: Read write data from the selected entry of the CAM device.

Step 510: Obtain updated write data by partially updating the write data read from the selected entry of the CAM device with partial write data.

Step 512: Calculate updated parity data for the obtained updated write data.

Step 514: Overwrite the original parity data by the updated parity data.

Step 516: Perform a partial write operation to overwrite only a portion of a write data stored in the entry of the CAM device by the partial write data, and accordingly store the updated write data (i.e., write data which is partially updated) in the selected entry of the CAM device.

Step 517: Check if parity check is required to be performed now. If yes, go to step 518; otherwise, go to step 506.

Step 518: Read write data from the selected entry of the CAM device.

Step 520: Read associated parity data corresponding to the selected entry of the CAM device from the storage device.

Step 522: Perform parity check upon the write data read from the selected entry of the CAM device according to the associated parity data read from the storage device.

Step 524: End.

As a person skilled in the art can readily understand details of each step shown in FIG. 5 after reading above paragraphs directed to the CAM system 400 shown in FIG. 4, further description is omitted here for brevity.

In the exemplary embodiment shown in FIG. 4, the parity calculator 404 is configured to generate the updated parity data $P_W'$ before the CAM device 102 performs the partial write operation based on the received partial write data $D_P$. In an alternative design, a parity calculator may be configured to generate updated parity data after the CAM device performs the partial write operation based on the received partial write data. The same objective of properly generating updated parity data needed by the parity check function is achieved.

Figure 6:
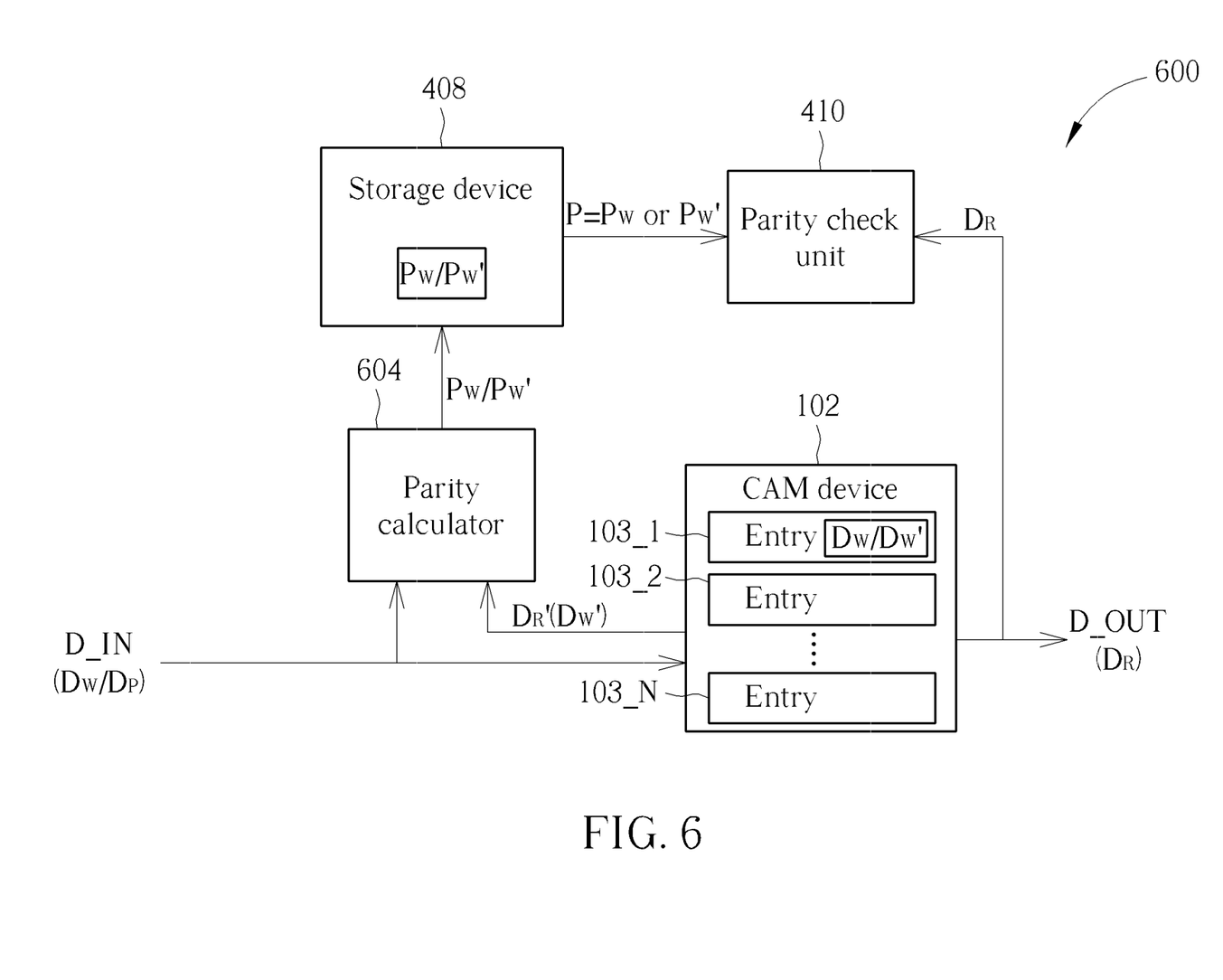
FIG. 6 is a block diagram illustrating a CAM system according to a third embodiment of the present invention.

Please refer to FIG. 6, which is a block diagram illustrating a CAM system according to a third embodiment of the present invention. For clarity and simplicity, only the processing associated with one write data for one CAM entry is described as below. The CAM system 600 includes a parity calculator (e.g., a parity encoder) 604 and the aforementioned storage device 408, parity check unit 410 and CAM device 102. When the original write data $D_W$ is input, the CAM device 102 performs a non-partial write operation to store the original write data $D_W$ into a selected entry (e.g., 103_1) of the CAM device 102 according to a designated address. Besides, the parity calculator 604 generates original parity data $P_W$ based on the original write data $D_W$ received by the CAM device 102, and stores the original parity data $P_W$ into the storage device 408. If there is no faulty/defective CAM cell existing in the entry 103_1, the write data actually stored in the selected entry 103_1 should be identical to the original write data $D_W$.

When partial write data $D_P$ is input, the CAM device 102 activates the write mask function to perform a partial write operation to overwrite only a portion of write data stored in the selected entry 103_1 by the partial write data $D_P$, and accordingly stores updated write data $D_W'$ in the selected entry 103_1. After the partial write operation is accomplished by the CAM device 102, the parity calculator 604 is operative to generate updated parity data $P_W'$. More specifically, the parity calculator 604 reads write data $D_R'$ from the selected entry 103_1 after the partial write operation is accomplished. If there is no faulty/defective CAM cell existing in the selected entry 103_1, the write data $D_R'$ should be identical to the updated write data $D_W'$ as expected to be stored in the selected entry 103_1. Next, the parity calculator 604 calculates the updated parity data $P_W'$ for the write data $D_R'$ read from the selected entry 103_1, and stores the updated parity data $P_W'$ into the storage device 408 to overwrite the original parity data $P_W$.

In accordance with the proposed parity data update scheme, if there is no partial write operation performed upon the data stored in the selected entry 103_1 of the CAM device 102, the corresponding parity data P read from the storage device 408 is the original parity data $P_W$; and if there is a partial write operation performed upon the data stored in the selected entry 103_1 of the CAM device 102, the corresponding parity data P read from the storage device 408 is the updated parity data $P_W'$.

With regard to the parity check unit 410, it performs parity check upon the write data $D_R$ read from the selected entry 103_1 of the CAM device 102 according to the parity data P corresponding to the selected entry 103_1 of the CAM device 102. Since the updated parity data $P_W'$ is still available to the parity check unit 410, the parity check performed upon the partially updated write data can work normally.

Figure 7:
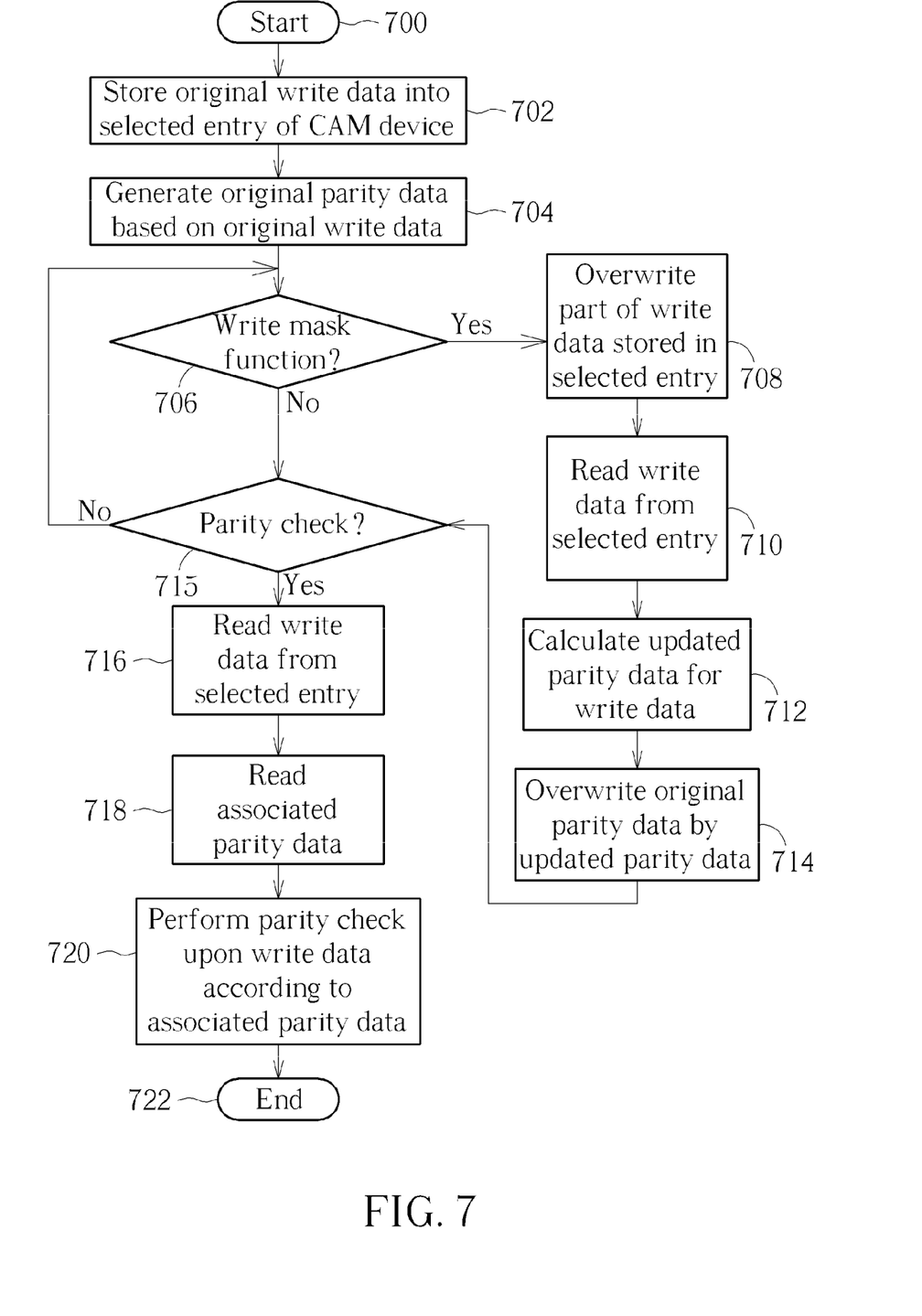
FIG. 7 is a flowchart illustrating a method of managing data stored in a CAM device according to a third embodiment of the present invention.

FIG. 7 is a flowchart illustrating a method of managing data stored in a CAM device according to a third embodiment of the present invention. Provided that the result is substantially the same, the steps are not required to be executed in the exact order shown in FIG. 7. The exemplary method may be employed by the CAM system 600 shown in FIG. 6, and can be briefly summarized using following steps.

Step 700: Start.

Step 702: Perform a non-partial write operation to store original write data (e.g., cell-C write data or cell-T write data) into a selected entry of a CAM device.

Step 704: Generate original parity data (e.g., cell-C parity data or cell-T parity data) based on the original write data, and store the original parity data into a storage device.

Step 706: Check if a write mask function is activated to perform a partial write operation upon data stored in the selected entry of the CAM device. If yes, go to step 708; otherwise, go to step 715.

Step 708: Perform a partial write operation to overwrite only a portion of write data stored in the selected entry of the CAM device by partial write data, and accordingly store updated write data (i.e., write data which is partially updated) in the selected entry of the CAM device.

Step 710: Read write data from the selected entry of the CAM device.

Step 712: Calculate updated parity data for the write data read from the selected entry of the CAM device.

Step 714: Overwrite the original parity data by the updated parity data.

Step 715: Check if parity check is required to be performed now. If yes, go to step 716; otherwise, go to step 706.

Step 716: Read write data from the selected entry of the CAM device.

Step 718: Read associated parity data corresponding to the selected entry of the CAM device from the storage device.

Step 720: Perform parity check upon the write data read from the selected entry of the CAM device according to the associated parity data read from the storage device.

Step 722: End.

As a person skilled in the art can readily understand details of each step shown in FIG. 7 after reading above paragraphs directed to the CAM system 600 shown in FIG. 6, further description is omitted here for brevity.

In above embodiments shown in FIG. 4 and FIG. 6, the parity update is performed immediately before or after the partial write operation is performed. As the parity update has to read write data from the CAM device for calculating updated parity data, the available bandwidth of the CAM device would be reduced, which may affect the normal operation of the CAM device and result in performance degradation of the CAM device. To address this issue, the present invention proposes a hybrid scheme including parity flag update as well as parity data update.

Figure 8:
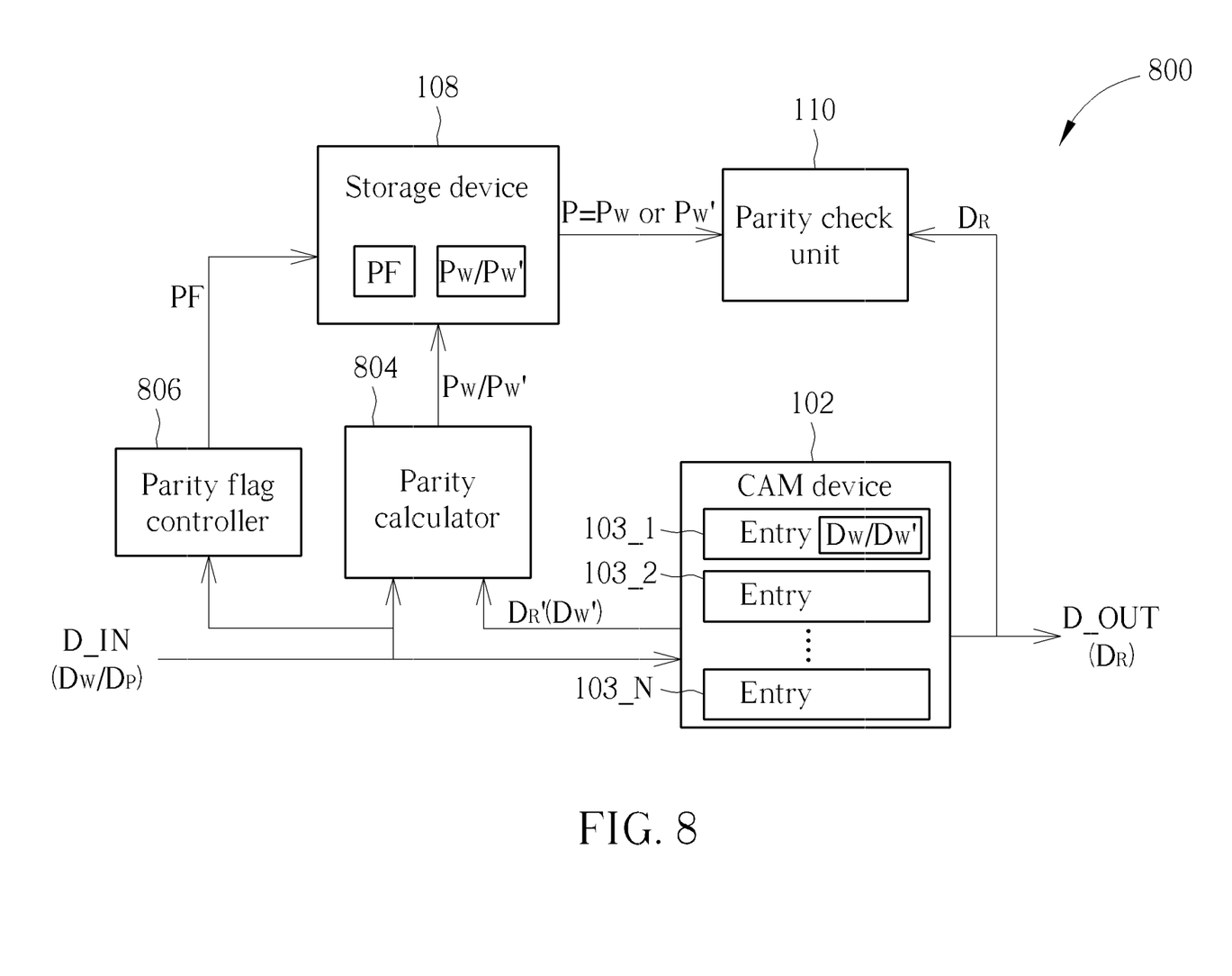
FIG. 8 is a block diagram illustrating a CAM system according to a fourth embodiment of the present invention.

Please refer to FIG. 8, which is a block diagram illustrating a CAM system according to a fourth embodiment of the present invention. For clarity and simplicity, only the processing associated with one write data for one CAM entry is described as below. The CAM system 800 includes a parity calculator (e.g., a parity encoder) 804, a parity flag controller 806, and the aforementioned storage device 108, parity check unit 110 and CAM device 102. When original write data $D_W$ is input, the CAM device 102 performs a non-partial write operation to store the original write data $D_W$ into a selected entry (e.g., 103_1) of the CAM device 102 according to a designated address. Besides, the parity calculator 804 generates original parity data $P_W$ based on the original write data $D_W$ received by the CAM device 102, and stores the original parity data $P_W$ into the storage device 108. The parity flag controller 806 sets a parity flag PF stored in the storage device 108 by one value (e.g., "0" or "1") to indicate that the original parity data $P_W$ is valid. For one example, when the parity flag PF is set by "1", associated parity data is indicated as valid; and when the parity flag PF is set by "0", the associated parity data is indicated as invalid. For another example, when the parity flag PF is set by "0", the associated parity data is indicated as valid; and when the parity flag PF is set by "1", the associated parity data is indicated as invalid.

As mentioned above, the CAM device 102 supports a partial write operation (e.g., a write mask function). Hence, when partial write data $D_P$ is input, the CAM device 102 performs a partial write operation to overwrite only a portion of write data stored in the selected entry 103_1 by the partial write data $D_P$, and accordingly stores updated write data $D_W'$ in the selected entry 103_1. In addition, when detecting that the partial write operation is performed by the CAM device 102, the parity flag controller 806 updates the parity flag PF in the storage device 108 by another logic value (e.g., "1" or "0") to indicate that the partial data corresponding to the selected entry 103_1 (i.e., the original parity data $P_W$) is invalid.

In this embodiment, after the partial write operation is accomplished by the CAM device 102, the parity calculator 804 further checks if a predetermined criterion is met, and refers to a checking result to determine if the parity data update is allowed to be executed. By way of example, but not limitation, the predetermined criterion is met when an available bandwidth of the CAM device 102 reaches a predetermined threshold. Hence, when it is determined that the predetermined criterion is met, the CAM device 102 is regarded as having enough bandwidth available to normal operation and the parity data update. At this moment, the parity calculator 804 is operative to generate updated parity data $P_W'$. More specifically, the parity calculator 804 reads write data $D_R'$ from the selected entry 103_1. If there is no faulty/defective CAM cell existing in the selected entry 103_1, the write data $D_R'$ should be identical to the updated write data $D_W'$ as expected to be stored in the selected entry 103_1. Next, the parity calculator 804 calculates the updated parity data $P_W'$ for the write data $D_R'$ read from the selected entry 103_1, and stores the updated parity data $P_W'$ into the storage device 108 to overwrite the original parity data $P_W$. It should be noted that the updated parity data $P_W'$ is generated based on the updated write data $D_W'$ which is stored in the selected entry 103_1 by the partial write operation. The parity flag controller 806 therefore updates the parity flag PF by another logic value (e.g., "1" or "0") to indicate that the updated parity data $P_W'$ is valid.

In accordance with the proposed parity data update scheme, if there is no partial write operation performed upon the data stored in the selected entry 103_1 of the CAM device 102, the corresponding parity data P read from the storage device 108 is the original parity data $P_W$; if there is a partial write operation performed upon the data stored in the selected entry 103_1 of the CAM device 102 and the predetermined criterion is not met yet, the corresponding parity data P read from the storage device 108 is still the original parity data $P_W$; and if there is a partial write operation performed upon the data stored in the selected entry 103_1 of the CAM device 102 and the predetermined criterion is met, the corresponding parity data P read from the storage device 108 is the updated parity data $P_W'$.

The parity check unit 110 reads write data $D_R$ stored in the selected entry 103_1. It should be noted that when there is no faulty/defective CAM cell existing in the entry 103_1, the write data $D_R$ read from the CAM device 102 should be identical to the original write data $D_W$ (if no partial write operation is performed) or the partially updated write data $D_W'$ as expected to be stored in the selected entry 103_1 (if the partial write operation is performed). The parity check unit 110 further reads the parity flag PF and the parity data P corresponding to the selected entry 103_1. As mentioned above, the parity check unit 110 refers to the parity flag PF to determine if the parity check should be executed. It should be noted that the parity flag PF is set by one logic value (e.g., "0") to indicate invalidity of the parity data when the partial write operation is performed, and is not updated to another logic value (e.g., "1") to indicate validity of the parity data until the predetermined condition is met after the partial write operation is accomplished. Though the parity data may be updated later due to the limited bandwidth of the CAM device 102, the parity flag PF is capable of preventing the parity check unit 110 from erroneously performing the parity check based on the invalid parity data.

Figure 9A:
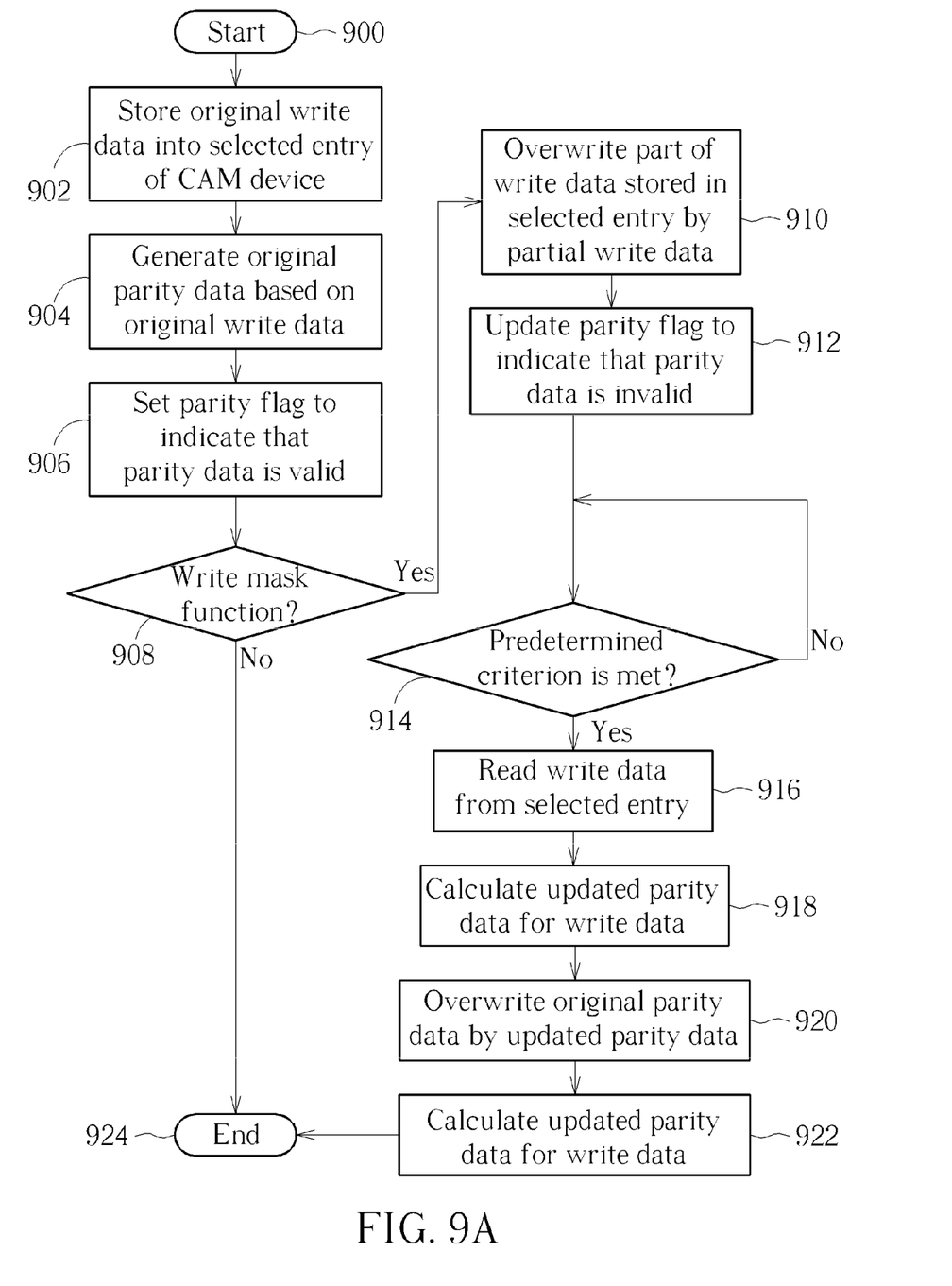
FIG. 9A and FIG. 9B are flowcharts illustrating a method of managing data stored in a CAM device according to a fourth embodiment of the present invention.
Figure 9B:
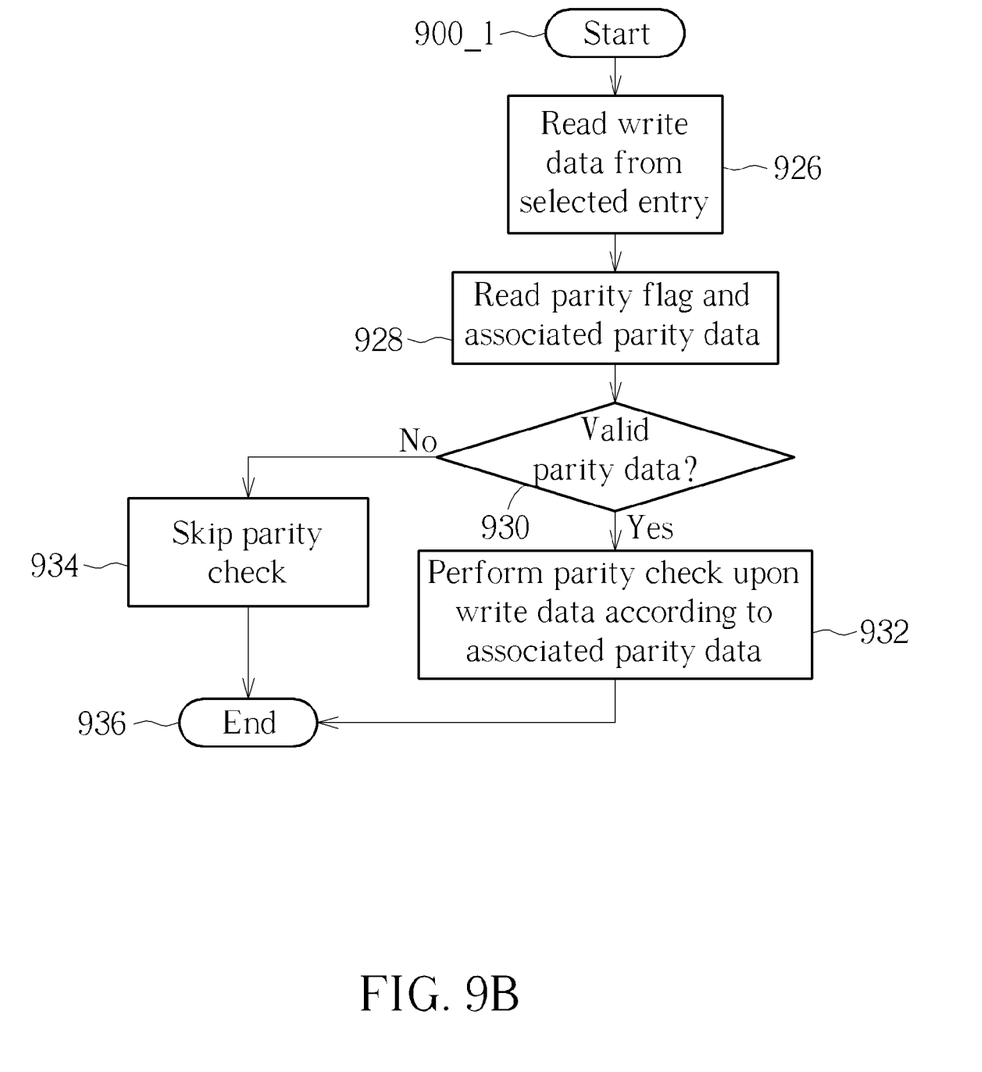

FIG. 9A and FIG. 9B are flowcharts illustrating a method of managing data stored in a CAM device according to a fourth embodiment of the present invention, where FIG. 9A shows the operation of encoding write data to generate parity data, the operation of setting the parity flag, and the operation of updating the parity flag; and FIG. 9B shows the operation of performing the parity check. Provided that the result is substantially the same, the steps are not required to be executed in the exact order shown in FIG. 9A and FIG. 9B. The exemplary method may be employed by the CAM system 800 shown in FIG. 8, and can be briefly summarized using following steps.

Step 900: Start.

Step 902: Perform a non-partial write operation to store original write data (e.g., cell-C write data or cell-T write data) into a selected entry of a CAM device.

Step 904: Generate original parity data (e.g., cell-C parity data or cell-T parity data) based on the original write data, and store the original parity data into a storage device.

Step 906: Set a parity flag (e.g., a cell-C parity flag or a cell-T parity flag) by one value to indicate that the original parity data is valid.

Step 908: Check if a write mask function is activated to perform a partial write operation upon data stored in the selected entry of the CAM device. If yes, go to step 910; otherwise, go to step 924.

Step 910: Perform a partial write operation to overwrite only a portion of write data stored in the selected entry of the CAM device by partial write data, and accordingly store updated write data (i.e., write data which is partially updated) in the selected entry of the CAM device.

Step 912: Update the parity flag by another value to indicate that parity data corresponding to the selected entry of the CAM device is invalid.

Step 914: Check if a predetermined criterion is met. If yes, go to step 916; otherwise, perform step 914 to check again.

Step 916: Read write data from the selected entry of the CAM device.

Step 918: Calculate updated parity data for the write data read from the selected entry of the CAM device.

Step 920: Overwrite the original parity data by the updated parity data.

Step 922: Update the parity flag by one value to indicate that the parity data corresponding to the selected entry of the CAM device is valid.

Step 924: End.

Step 900_1: Start.

Step 926: Read write data from the selected entry of the CAM device.

Step 928: Read the parity flag and associated parity data corresponding to the selected entry of the CAM device from the storage device.

Step 930: Check if the parity flag indicates that the associated parity data is valid. If yes, go to step 932; otherwise, go to step 934.

Step 932: Perform parity check upon the write data read from the selected entry of the CAM device according to the associated parity data read from the storage device. Go to step 936.

Step 934: Skip the parity check.

Step 936: End.

It is noted that the steps are not required to be executed in the exact order shown in FIG. 9A and FIG. 9B. For example, step 908 is not necessary to be executed directly after step 906, and the step 930 is not necessary to be executed directly after step 928 in some embodiments. As a person skilled in the art can readily understand details of each step shown in FIG. 9A and FIG. 9B after reading above paragraphs directed to the CAM system 800 shown in FIG. 8, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing data stored in a content addressable memory (CAM) device, comprising:
    performing a partial write operation to overwrite only a portion of write data stored in an entry of the CAM device by partial write data to store updated write data in the entry of the CAM device, wherein the updated write data in the entry of the CAM device includes non-overwritten bits of the write data and bits of the partial write data; and
    updating a parity flag by a first value to indicate that parity data corresponding to the entry of the CAM device is invalid, and referring to the parity flag for selectively performing parity check upon the write data read from the entry of the CAM device according to the parity data corresponding to the entry of the CAM device, wherein the parity data is generated by parity calculation.

2. The method of claim 1, further comprising:
    performing a non-partial write operation to store original write data into the entry of the CAM device;
    generating original parity data based on the original write data;
    storing the original parity data to act as the parity data corresponding to the entry of the CAM device; and
    setting the parity flag by a second value to indicate that the original parity data is valid.

3. The method of claim 1, further comprising:
    generating updated parity data based on the updated write data stored in the entry of the CAM device;
    overwriting the parity data corresponding to the entry of the CAM device by the updated parity data; and
    updating the parity flag by a second value to indicate that the updated parity data is valid.

4. The method of claim 3, further comprising:
    checking if a predetermined criterion is met;
    wherein the step of generating the updated parity data is performed when the predetermined criterion is met.

5. The method of claim 4, wherein the predetermined criterion is met when an available bandwidth of the CAM device reaches a predetermined threshold.

6. A method for checking data stored in a content addressable memory (CAM) device, comprising:
    reading a parity flag associated with an entry of the CAM device, wherein the parity flag is set to indicate whether parity data corresponding to the entry of the CAM device is valid or invalid; and
    referring to the parity flag for selectively performing parity check upon write data read from the entry of the CAM device according to the parity data corresponding to the entry of the CAM device, wherein the parity data is generated by parity calculation.

7. The method of claim 6, wherein the step of selectively performing the parity check upon the write data read from the entry of the CAM device comprises:
    when the parity flag has a first value which indicates that the parity data corresponding to the entry of the CAM device is valid, performing the parity check; and
    when the parity flag has a second value which indicates that the parity data corresponding to the entry of the CAM device is invalid, skipping the parity check.

8. A method for managing data stored in a content addressable memory (CAM) device, comprising:
    performing a partial write operation to overwrite only a portion of write data stored in an entry of the CAM device by partial write data to store updated write data in the entry of the CAM device, wherein the updated write data in the entry of the CAM device includes non-overwritten bits of the write data and bits of the partial write data;
    reading a parity flag associated with an entry of the CAM device, wherein the parity flag is set to indicate whether parity data corresponding to the entry of the CAM device is valid or invalid;
    generating updated parity data based on at least write data read from the entry of the CAM device; and
    overwriting original parity data by the updated parity data, and referring to the parity flag for selectively performing parity check upon the write data read from the entry of the CAM device according to the parity data corresponding to the entry of the CAM device, wherein the original parity data is generated based on original write data stored into the entry of the CAM device.

9. The method of claim 8, wherein the step of generating the updated parity data is performed before the step of performing the partial write operation, and comprises:
    obtaining the write data read from the entry of the CAM device;
    obtaining updated write data by partially updating the obtained write data read from the entry of the CAM device by the partial write data; and
    calculating the updated parity data for the obtained updated write data.

10. The method of claim 8, wherein the step of generating the updated parity data is performed after the step of performing the partial write operation, and comprises:
    reading the updated write data from the entry of the CAM device; and
    calculating the updated parity data for the updated write data read from the entry of the CAM device.

11. A content addressable memory (CAM) system, comprising:
a CAM device, arranged for performing a partial write operation to overwrite only a portion of write data stored in an entry of the CAM device by partial write data to store updated write data in the entry of the CAM device, wherein the updated write data in the entry of the CAM device includes non-overwritten bits of the write data and bits of the partial write data;
a storage device, arranged for storing a parity flag of parity data corresponding to the entry of the CAM device; and
a parity flag controller, arranged for updating the parity flag by a first value to indicate that the parity data corresponding to the entry of the CAM device is invalid, and referring to the parity flag for selectively performing parity check upon the write data read from the entry of the CAM device according to the parity data corresponding to the entry of the CAM device, wherein the parity data is generated by parity calculation.

12. The CAM system of claim 11, wherein the CAM device is further arranged for performing a non-partial write operation to store original write data into the entry of the CAM device; the CAM system further comprises: a parity calculator, arranged for generating original parity data based on the original write data, and storing the original parity data into the storage device to act as the parity data corresponding to the entry of the CAM device; and the parity flag controller is further arranged for setting the parity flag by a second value to indicate that the original parity data is valid.

13. The CAM system of claim 11, further comprising:
a parity calculator, arranged for generating updated parity data based on the updated write data stored in the entry of the CAM device, and overwriting the parity data corresponding to the entry of the CAM device by the updated parity data;
wherein the parity flag controller is further arranged for updating the parity flag by a second value to indicate that the updated parity data stored in the storage device is valid.

14. The CAM system of claim 13, wherein the parity calculator is further arranged for checking if a predetermined criterion is met; and the updated parity data is generated by the parity calculator when the predetermined criterion is met.

15. The CAM system of claim 14, wherein the predetermined criterion is met when an available bandwidth of the CAM device reaches a predetermined threshold.

16. A content addressable memory (CAM) system, comprising:
a CAM device, arranged for storing write data in an entry of the CAM device;
a storage device, arranged for storing parity data and a parity flag, wherein the parity flag is set to indicate whether the parity data corresponding to the entry of the CAM device is valid or invalid; and
a parity check unit, arranged for reading the parity flag from the storage device, and referring to the parity flag for selectively performing parity check upon the write data read from the entry of the CAM device according to the parity data corresponding to the entry of the CAM device, wherein the parity data is generated by parity calculation.

17. The CAM system of claim 16, wherein when the parity flag has a first value which indicates that the parity data corresponding to the entry of the CAM device is valid, the parity check unit performs the parity check; and when the parity flag has a second value which indicates that the parity data corresponding to the entry of the CAM device is invalid, the parity check unit skips the parity check.

18. A content addressable memory (CAM) system, comprising:
a CAM device, arranged for performing a partial write operation to overwrite only a portion of write data stored in an entry of the CAM device by partial write data to store updated write data in the entry of the CAM device, wherein the updated write data in the entry of the CAM device includes non-overwritten bits of the write data and bits of the partial write data;
a storage device, arranged for storing parity data and a parity flag, wherein the parity flag is set to indicate whether the parity data corresponding to the entry of the CAM device is valid or invalid; and
a parity calculator, arranged for generating updated parity data based on at least write data read from the entry of the CAM device, and overwriting original parity data by the updated parity data, and referring to the parity flag for selectively performing parity check upon the write data read from the entry of the CAM device according to the parity data corresponding to the entry of the CAM device, wherein the original parity data is generated by the parity calculator based on original write data stored into the entry of the CAM device.

19. The CAM system of claim 18, wherein the parity calculator generates the updated parity data before the CAM device performs the partial write operation; and the parity calculator generates the updated parity data by:
obtaining the write data read from the entry of the CAM device;
obtaining updated write data by partially updating the obtained write data read from the entry of the CAM device by the partial write data; and
calculating the updated parity data for the obtained updated write data.

20. The CAM system of claim 18, wherein the parity calculator generates the updated parity data after the CAM device performs the partial write operation; and the parity calculator generates the updated parity data by:
reading the updated write data from the entry of the CAM device; and
calculating the updated parity data for the updated write data read from the entry of the CAM device.

* * * * *